(12) United States Patent
Sato

(10) Patent No.: US 6,882,362 B2
(45) Date of Patent: Apr. 19, 2005

(54) IMAGE PROCESSING SYSTEM HAVING AN IMAGE SIGNAL GENERATING DEVICE COUPLEABLE TO AN ADAPTER

(75) Inventor: Eiichi Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/007,102

(22) Filed: Jan. 14, 1998

(65) Prior Publication Data

US 2002/0003572 A1 Jan. 10, 2002

Related U.S. Application Data

(62) Division of application No. 08/636,630, filed on Apr. 23, 1996, now Pat. No. 5,727,049, which is a continuation of application No. 08/301,034, filed on Sep. 6, 1994, now abandoned, which is a continuation of application No. 07/795,336, filed on Nov. 20, 1991, now abandoned.

(30) Foreign Application Priority Data

Nov. 21, 1990 (JP) ............................................. 2-318975

(51) Int. Cl.[7] ......................... H04N 5/228; H04N 5/225
(52) U.S. Cl. .................................. 348/222.1; 348/375
(58) Field of Search ........................... 348/14.01, 14.04, 348/207.99, 222.1, 373–375, 552, 12–17, 207, 222, 231, 232, 233; 386/38, 40, 92, 117, 120, 121; 358/906, 909.1; H04N 5/228, 5/76, 7/00, 7/14

(56) References Cited

U.S. PATENT DOCUMENTS

| | | | | |
|---|---|---|---|---|
| 4,746,990 A | * | 5/1988 | Katoh .......................... 386/38 |
| 4,814,876 A | | 3/1989 | Horio et al. ................. 348/333 |
| 4,857,993 A | * | 8/1989 | Music ..................... 375/240.1 |
| 4,888,648 A | | 12/1989 | Takeuchi et al. .............. 386/52 |
| 4,897,732 A | | 1/1990 | Kinoshita et al. ........... 386/118 |
| 4,907,231 A | | 3/1990 | Watanabe et al. ........... 714/735 |
| 4,910,604 A | | 3/1990 | Takei et al. .................... 386/95 |
| 4,928,300 A | * | 5/1990 | Ogawa .......................... 348/14 |
| 4,951,147 A | * | 8/1990 | Aknar ........................ 348/143 |
| 4,969,042 A | | 11/1990 | Houtman et al. .............. 348/12 |
| 5,040,068 A | * | 8/1991 | Parulski ...................... 348/376 |
| 5,084,775 A | | 1/1992 | Kodama et al. ............. 386/117 |
| 5,121,261 A | | 6/1992 | Isogai et al. .................. 386/90 |
| 5,130,813 A | * | 7/1992 | Oie ............................. 358/906 |
| 5,170,262 A | * | 12/1992 | Kinoshita ................... 348/231 |
| 5,396,269 A | * | 3/1995 | Gotoh .......................... 348/14 |
| 5,432,525 A | * | 7/1995 | Maruo ........................ 345/2.2 |
| 5,612,732 A | * | 3/1997 | Yuyama ....................... 348/14 |
| 5,619,252 A | * | 4/1997 | Nakano ................... 348/14.01 |
| 5,727,049 A | * | 3/1998 | Sato ............................ 379/14 |

FOREIGN PATENT DOCUMENTS

| | | | |
|---|---|---|---|
| EP | 0348623 | 1/1990 | ............ H04N/7/14 |
| JP | 01-168154 | 7/1989 | .......... H04M/11/00 |
| JP | 01-277076 | 11/1989 | ............ H04N/5/92 |
| JP | 01277081 | 11/1989 | ............ H04N/7/14 |
| JP | 01-318478 | 12/1989 | ............ H04N/7/08 |
| JP | 02-094860 | 4/1990 | .......... H04M/11/00 |
| JP | 02-270477 | 11/1990 | .......... H04N/5/225 |
| WO | WO 87/03764 | 6/1987 | |

* cited by examiner

Primary Examiner—Ngoc-Yen Vu
(74) Attorney, Agent, or Firm—Fitzpatrick, Cella, Harper & Scinto

(57) ABSTRACT

An image transmission system including an image pickup device having an image pickup portion for converting a subject image into an image signal, a recording/reproducing device for recording/reproducing the image signal to and from a medium, a first interface device and an adapter for a public circuit which is detachable from the image pickup device, the public circuit adapter having a second interface device for establishing an interface with the first interface device and a device for, via a public circuit, transmitting image data received from the second interface device.

12 Claims, 13 Drawing Sheets

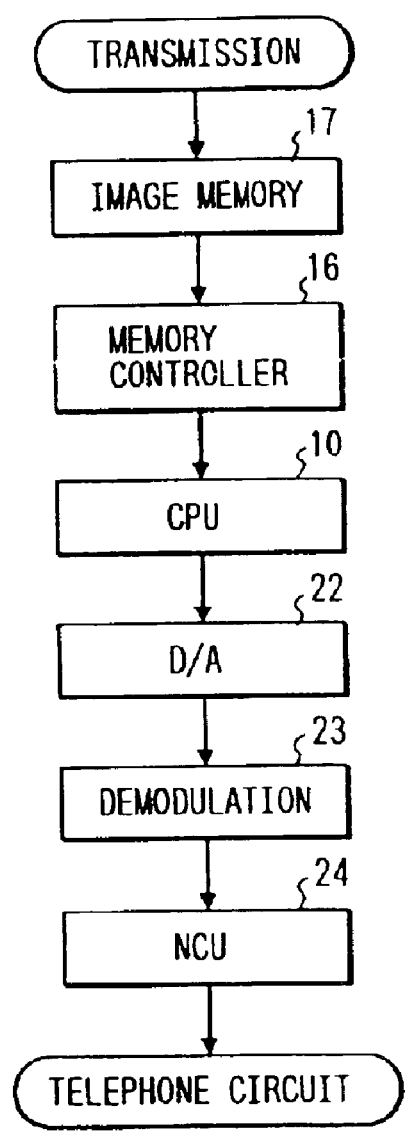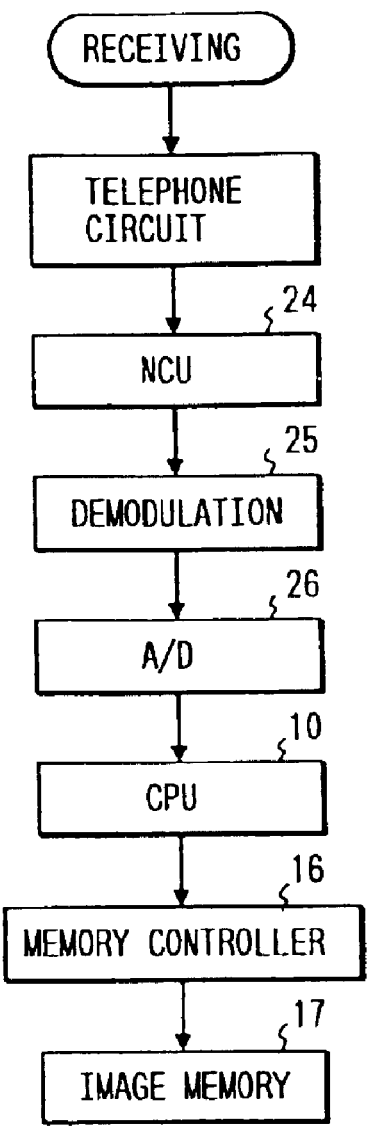
FIG. 6
FIG. 7

IMAGE PROCESSING SYSTEM HAVING AN IMAGE SIGNAL GENERATING DEVICE COUPLEABLE TO AN ADAPTER

This application is a divisional of application Ser. No. 08/636,630 filed Apr. 23, 1996, now U.S. Pat. No. 5,727,049, which is a continuation of application Ser. No. 08/301,034 filed Sep. 6, 1994, now abandoned, which is a continuation of application Ser. No. 07/795,336 filed Nov. 20, 1991, now abandoned.

BACKGROUND OF THE INVENTION

1. Field of the Invention

The present invention relates to an image processing system and an apparatus for forming the image processing system.

2. Description of the Related Background Art

A TV telephone apparatus for use as an example of an image processing system is formed into an integrated structure in such a manner that a camera serving as an image input device is included in the body of the TV telephone apparatus. Furthermore, regarding an image recording means used in the TV telephone apparatus, a method has been known in which a signal, which has been modulated so as to be transmitted, is recorded on a cassette tape after it has been fetched through the audio output another method has been known in which a video signal is recorded on a video tape after it has been fetched through a video output.

However, the above-described conventional structures encounter the following problems:

Since the conventional structure is arranged in such a manner that the camera and the transmission portion are integrally formed and the position of the camera is fixed, there has been a limit present in the compositions which can be photographed, and it is often difficult to photograph a document or a subject. For example, a subject present outdoors or a subject positioned in another space cannot be photographed.

SUMMARY OF THE INVENTION

An object of the present invention is to provide an image processing system capable of overcoming the above-described conventional problems.

Another object of the present invention is to provide a system capable of causing a camera to face a subject and transmit, if necessary, through a public circuit, an image photographed by the camera.

In order to achieve the above-described objects, according to one aspect of the present invention, there is provided a system comprising a camera which has an image pickup portion, a recording portion, and an interface portion for an adapter; and an adapter which transmits an image to a public circuit and which has an interface portion for the above-described camera.

According to another aspect of the present invention, there is provided a camera which is detachable from an adapter for transmitting an image to a public circuit and which has an image pickup portion, a recording portion and an interface portion for the adapter.

According to another aspect of the present invention, there is provided an adapter for a public circuit which is detachable from a camera which has an image pickup portion, a recording portion and an interface portion for the adapter, the adapter having an interface portion for the above-described camera.

Another object of the present invention is to provide an image processing system capable of supplying electric power to each of the elements when an image signal generating means, such as a camera and a device for receiving an image signal supplied from the above-described means, are constituted as individual members.

Another object of the present invention is to provide an image processing system having a novel structure, function, or interface.

Other and further objects, features and advantages of the invention will be appear more fully from the following description.

BRIEF DESCRIPTION OF THE DRAWINGS

FIG. 6 is a chart which illustrates the flow of a signal at the time of a transmission mode;

FIG. 7 is a chart which illustrates the flow of a signal at the time of a receiving mode;

DETAILED DESCRIPTION OF THE PREFERRED EMBODIMENTS

Figure 1:
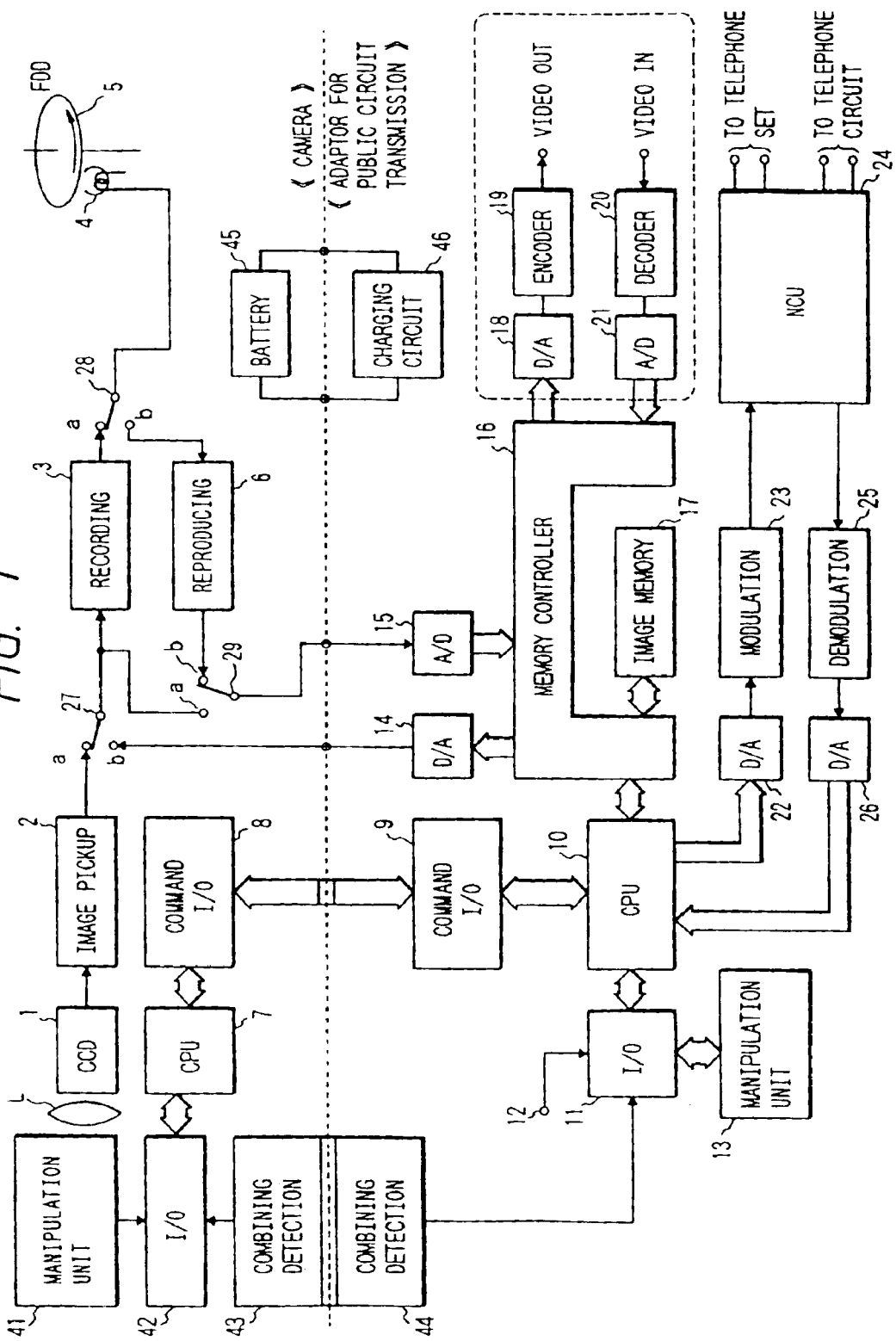
FIG. 1 is a block diagram which illustrates an embodiment of the present invention.

FIG. 1 is a block diagram which illustrates a system according to an embodiment of the present invention. Referring to FIG. 1, a portion above a short dash line illustrates an SV camera, while a portion below the same illustrates a block of a TV telephone adapter.

Referring to FIG. 1, reference numeral 1 represents a CCD which is an image pickup device of a camera and 2 represents an image pickup processing circuit for converting a signal transmitted from the CCD1 into a video signal. Reference numeral 3 represents a record processing circuit for modulating the video signal into a signal to be written to a floppy disk 5. Reference numeral 4 represents a head for recording/reproducing the signal to and from the floppy disk 5. Reference numeral 5 represents the floppy disk serving as a recording medium for an image and 6 represents a reproduction processing circuit for demodulating a reproduction signal transmitted from the floppy disk 5 into the video signal. Reference numeral 7 represents a CPU for controlling the overall control operation of the camera portion. Reference numeral 8 represents a command I/O for establishing a command interface with an adapter for a public circuit transmission (hereinafter called a "TV telephone adapter"). Reference numeral 9 represents a command I/O for establishing a command interface with an SV camera and 10 represents a CPU for controlling the overall control operation of the TV telephone adapter portion. Reference numeral 11 represents an I/O for controlling the manipulation system of the TV telephone and 12 represents a photodetector which is an infrared ray remote control light receiving device. Reference numeral 13 represents a manipulation unit fastened to the TV telephone adapter and 14 represents a D/A converter for D/A converting a signal transmitted from an image memory 17 to transmit it to the SV camera portion. Reference numeral 15 represents an D/A converter for A/D converting the video signal transmitted from the camera portion to record it to the image memory 17. Reference numeral 16 represents a memory controller for establishing an interface between the image memory and an external portion to write/read the signal to and from the memory 17. Reference numeral 18 represents a D/A converter for converting data stored in the image memory 17 into an analog signal of a video rate. Reference numeral 19 represents a video encoder for converting a signal transmitted from the D/A converter 18 into a video signal. Reference numeral 20 represents a video decoder for converting a video signal transmitted from an external portion into a signal to be recorded to the image memory 17. The structure constituted by the above-described elements 18 to 20 may be provided for an adapter portion for public circuit transmission as an alternative to the camera portion. Reference numeral 21 represents-an D/A converter for converting a signal transmitted from the video decoder 20 into a digital signal. Reference numeral 22 represents a D/A converter for converting data transmitted from the CPU 10 into an analog signal. Reference numeral 23 represents a modulation circuit for modulating a signal transmitted from the D/A converter 22 into a signal of a transmission format adaptable to the TV telephone. Reference numeral 24 represents an NCU (Network Control Unit) for establishing an interface between the telephone circuit and the TV telephone adapter. Reference numeral 25 represents a demodulation circuit for demodulating the received signal into a signal of a base band. Reference numeral 26 represents an A/D converter for digital-converting the demodulating signal so as to transmit it to the CPU 10. Reference numeral 27 represents a switch for selecting a signal supplied from the CCD1 or a signal transmitted from the floppy disk 5 so as to transmit the selected signal to the record processing circuit 3. Reference numeral 28 represents a switch for selecting data recording to the floppy disk 5 or data reading from the same. Reference numeral 29 represents a switch for selecting a signal supplied from the CCD1 or that supplied from the floppy disk 5 so as to transmit the selected signal to the TV telephone portion. Reference numeral 41 represents a camera manipulating unit, 42 represents an I/O device, 43 represents a combining detection circuit for the SV camera and 44 represents a combining detection circuit for the TV telephone adapter. Reference numeral 45 represents a battery for the SV camera, 46 represents a battery charging circuit for supplying electric power to the adapter elements. The battery charging circuit 46 charges the battery 45 after it has converted the electric power supplied from a commercial power source.

Figure 2:
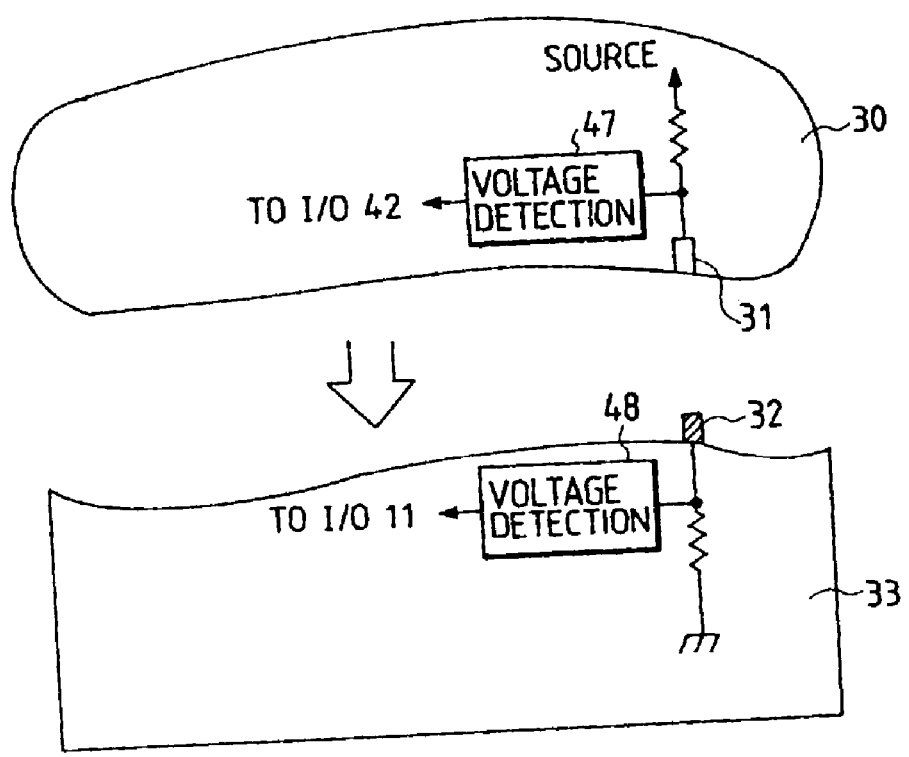
FIG. 2 illustrates the structure of the combining detection means 43 shown in FIG. 1.

FIG. 2 illustrates the combining detection circuits 43 and 44 shown in FIG. 1 in detail. Reference numeral 30 represents the SV camera and 31 represents a combining detection contact for the SV camera 30. Reference numeral 32 represents a combining detection contact for the TV telephone adapter, 33 represents a TV telephone adapter and 47 and 48 represent a combining voltage detection circuit.

Since the structure is constituted as described above, when the SV camera 30 is combined with the TV telephone adapter 33, the combining detection contacts 31 and 32 may encounter short circuits, causing combining voltage detection circuits 47 and 48 to fail. The combining voltage detection circuits 47 and 48 convert the combining voltage into digital signals so as to transmit them to the corresponding CPUs as detection signals. When the CPU 7 of the SV camera 30 detects the thus-supplied signal, the SV camera 30 temporarily stops its camera operation but commences an operation to serve as an image input and recording device for the TV telephone. As shown in FIG. 1, the TV telephone adapter 33 is provided with the charging circuit 46 for the SV camera 30 so that charging of the battery 45 of the SV camera 30 is commenced simultaneously with docking. The SV camera and the TV telephone adapter thus combined with each other operate while performing communication by means of their CPUs via the command I/Os 8 and 9.

Figure 8:
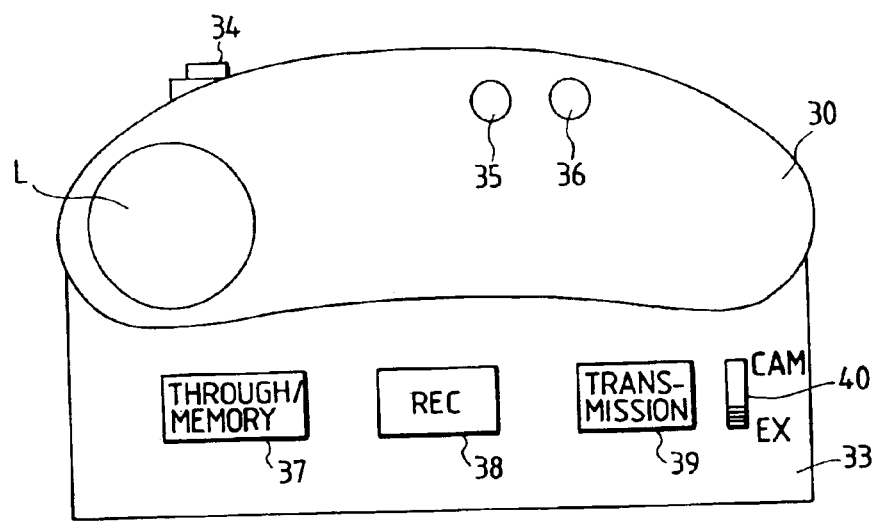
FIG. 8 illustrates the configuration of switches according to this embodiment of the present invention.
Figure 10:
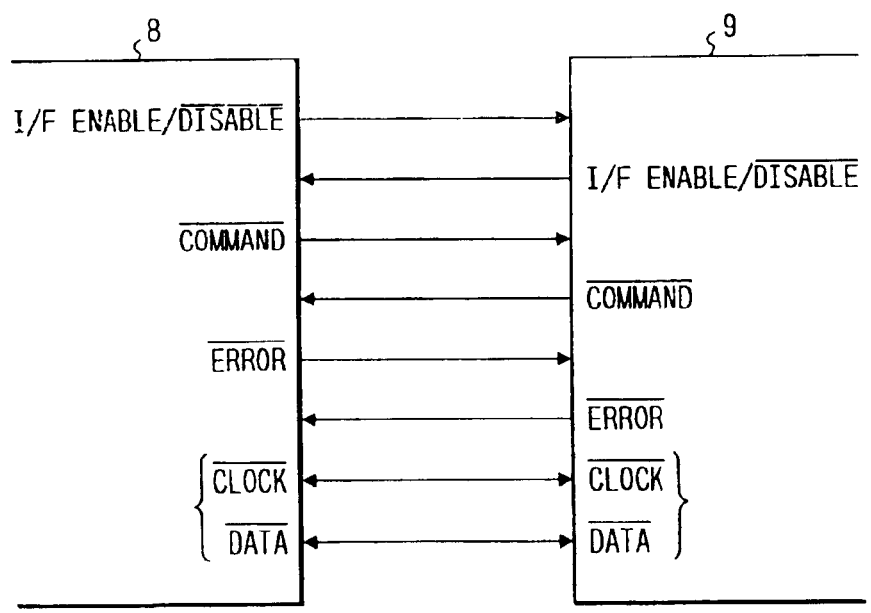
FIG. 10 illustrates the connections established between command I/Os according to this embodiment of the present invention.

FIG. 8 illustrates the configuration of the manipulation switches according to this embodiment. Referring to FIG. 8, reference numeral 30 represents the SV camera, 33 represents the TV telephone adapter and 34 represents a shutter switch for the camera 30, the shutter switch 34 acting as a memory freeze switch when combining has been completed. Reference numerals 35 and 36 respectively represent an ADDRESS-UP switch and an ADDRESS-DOWN switch for the camera 30, the two switches 35 and 36 acting after combining has been completed. Reference numeral 38 represents a Rec trigger switch for recording data to the floppy disk 5, which is a recording medium and which is loaded into the camera 30. Reference numeral 39 represents a TV telephone transmission switch and 40 represents a switch for selecting an input signal for any of three inputs, that is, the input for the camera system, that for the floppy system (according to this embodiment, it is expressed as "SV" because the SV floppy disk is employed) and that for an external system. When any of the above-described switches is depressed, the corresponding CPU discriminates this fact so as to perform a control operation by means of communication. FIG. 10 illustrates the status of wiring arranged in the command I/Os 8 and 9 which will be described.

Figure 11:
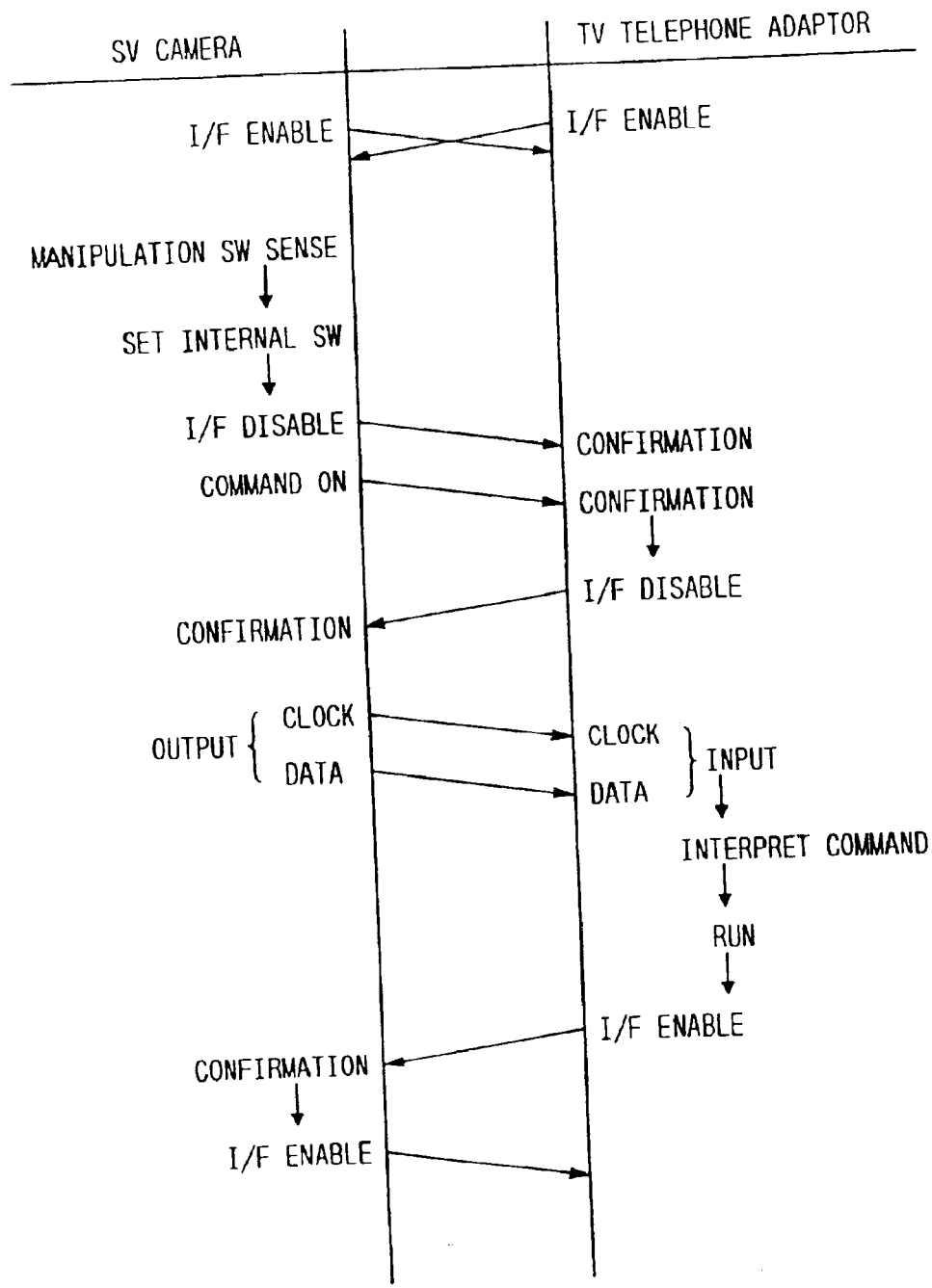
FIG. 11 illustrates a command I/O flow (from an SV floppy camera to a TV telephone adapter) according to this embodiment of the present invention.
Figure 12:
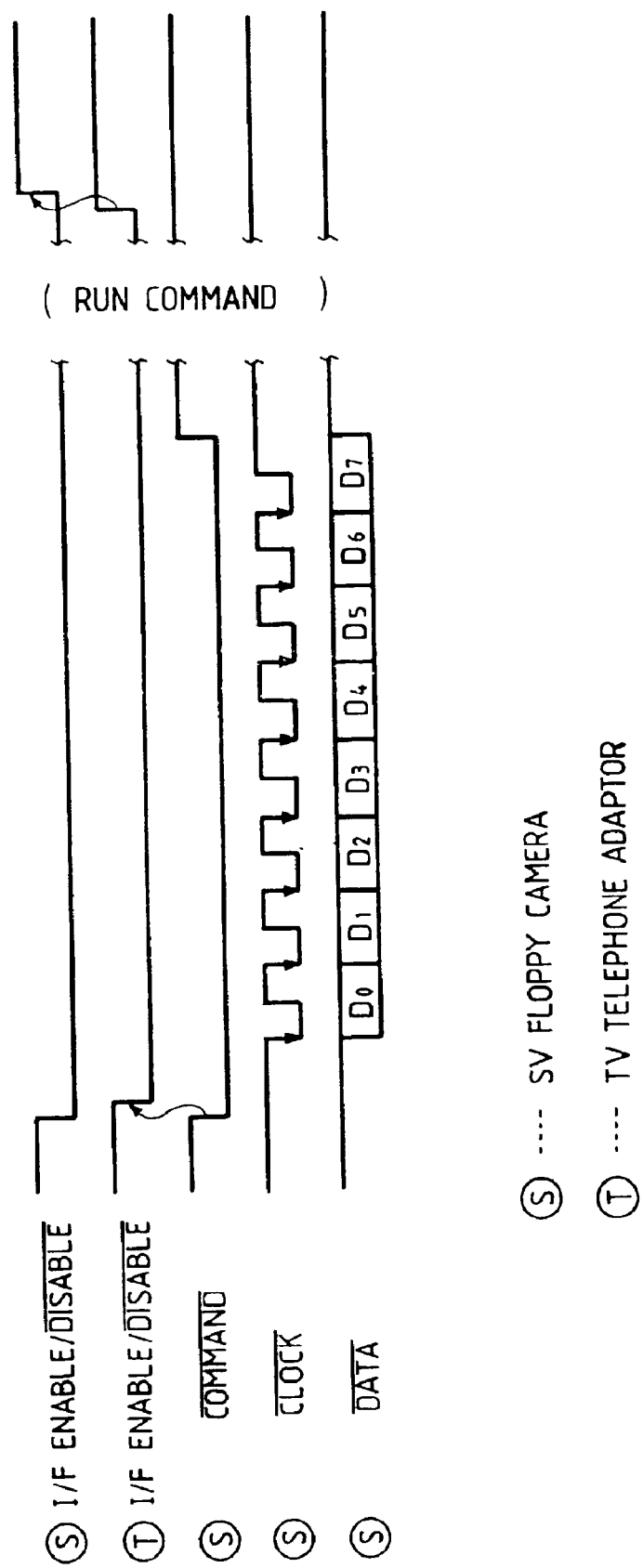
FIG. 12 is a time chart for a command I/O (from an SV floppy camera to a TV telephone adapter) according to this embodiment of the present invention.
Figure 13:
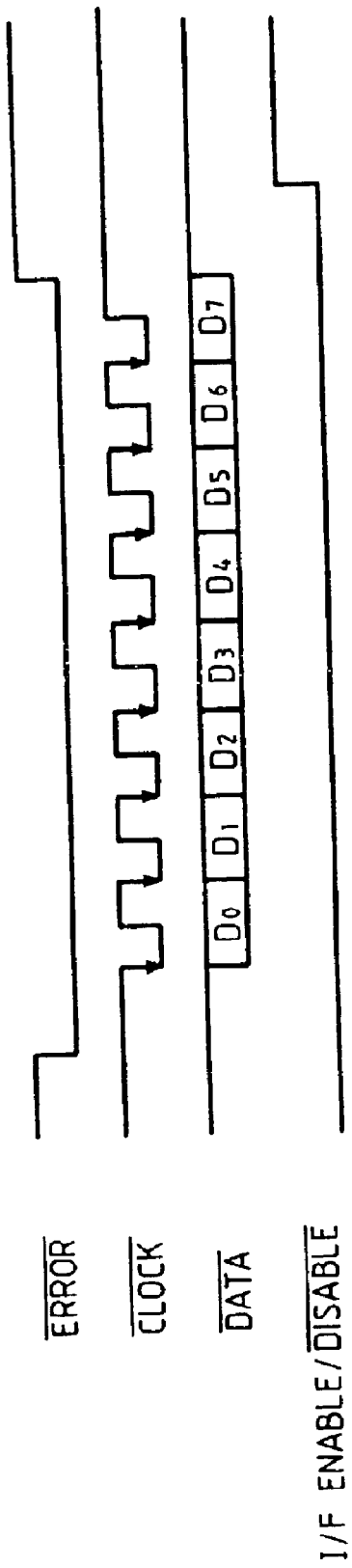
FIG. 13 is a time chart which illustrates a process according to the present invention when an error has taken place.

FIG. 11 is a flow chart which illustrates the contents of the command interface when the switch for the SV camera 30 is depressed. In a state where no switch is depressed, an "I/F Enable/$\overline{\text{Disable}}$" signal is enabled. When any of the switches for the camera 30 is depressed, the CPU7 for the camera 30 sets any of the internal switches 27, 28 or 29 in accordance with the type of function of the depressed switch. After setting of any of the switches 27,28 or 29 has been completed, the CPU7 disables the "I/F Enable/$\overline{\text{Disable}}$" signal at the I/O8 as well as activating the "Command" signal. When the CPU10 of the TV telephone adapter 33 confirms that the above-described two signals have been activated, it disables the "I/F Enable/$\overline{\text{Disable}}$" signal at the command I/O9 to make a response. When the CPU7 of the SV camera 30 detects a response signal thus-transmitted, the CPU10 discriminates that the command wait state has been realized and it transmits a Clock signal and a command data signal which is in synchronization with the Clock signal so as to supply command information to the CPU10. If, for example, the freeze switch 34 shown in FIG. 8 is depressed, the SV camera side CPU7 switches over the internal switches 27 to 29 in accordance with setting of the input signal switch 40 before it issues a freeze command to the adapter side CPU10 (in a case where the address UP and DOWN switches 35 and 36 are depressed, the command issue can be eliminated). The CPU10, which has received the above-described signal, reads the command in response to a synchronization signal before it interprets the command to execute it. In a case where no error takes place after the execution, the "I/F Enable/Disable" signal is again enabled before camera side CPU7 is acquainted with the completion of the execution. If an error has taken place, an "Error" signal is, as shown in FIG. 13, activated to transmit/return error information as "Data" which is in synchronization with "Clock" before the "I/F Enable/Disable" signal is again enabled to complete the communication. When the camera side CPU7 for the SV camera 30 detects the "Error" signal, it reads error data before it confirms a fact that the "I/F Enable/Disable" signal has been enabled. Then, it again enables the "I/F Enable/Disable" signal at the command I/O8 to complete the communication. If no error has taken place, the fact that the "I/F Enable/Disable" signal at the command I/O9 has been enabled is confirmed as shown in FIGS. 11 and 12 before it enables the "I/F Enable/Disable" signal at the command I/O8 to complete the communication. The communication protocol is arranged to act as described above when the manipulation switch for the SV camera 30 is depressed.

Figure 14:
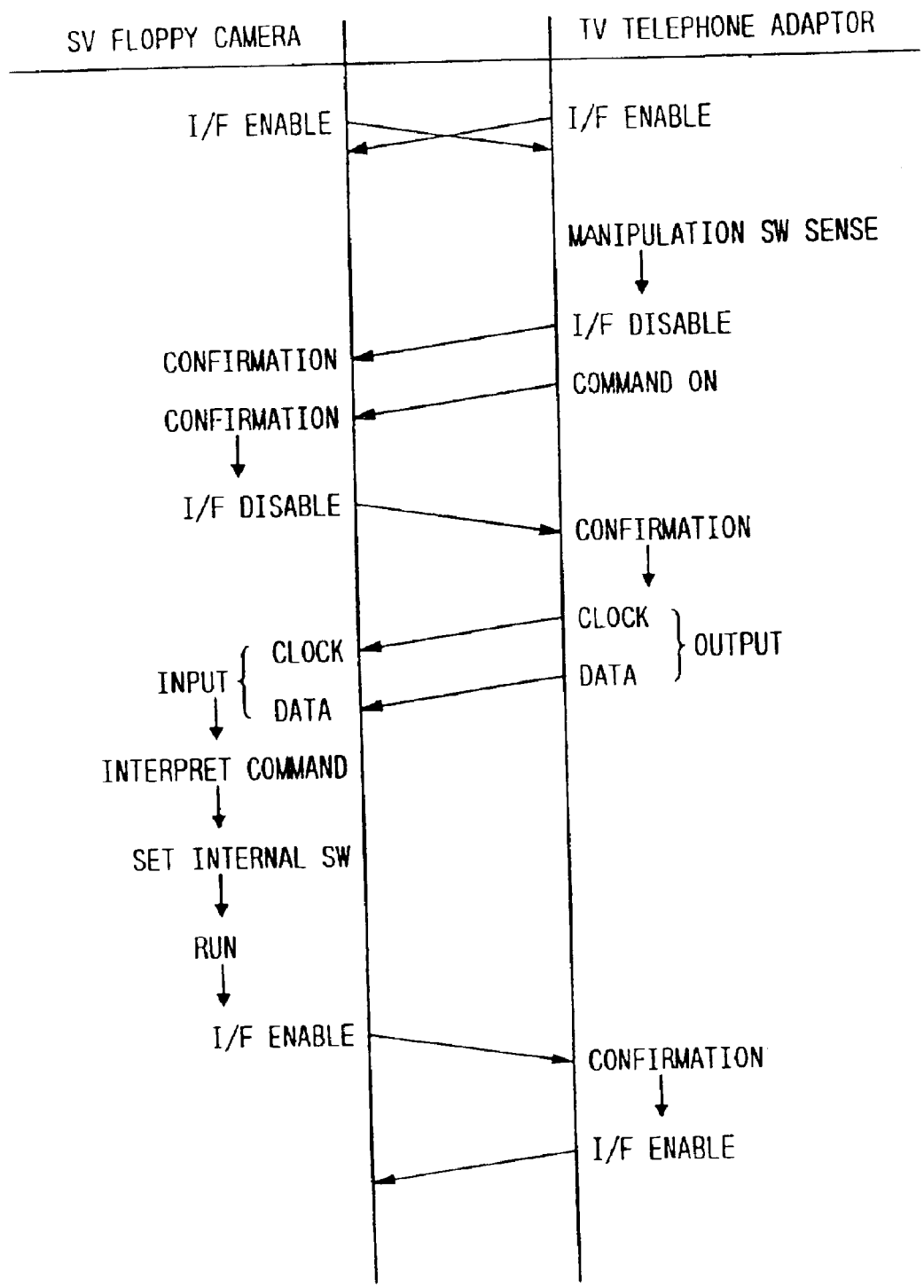
FIG. 14 illustrates a command I/O flow (from a TV telephone adapter to an SV floppy camera) according to this embodiment of the present invention.
Figure 15:
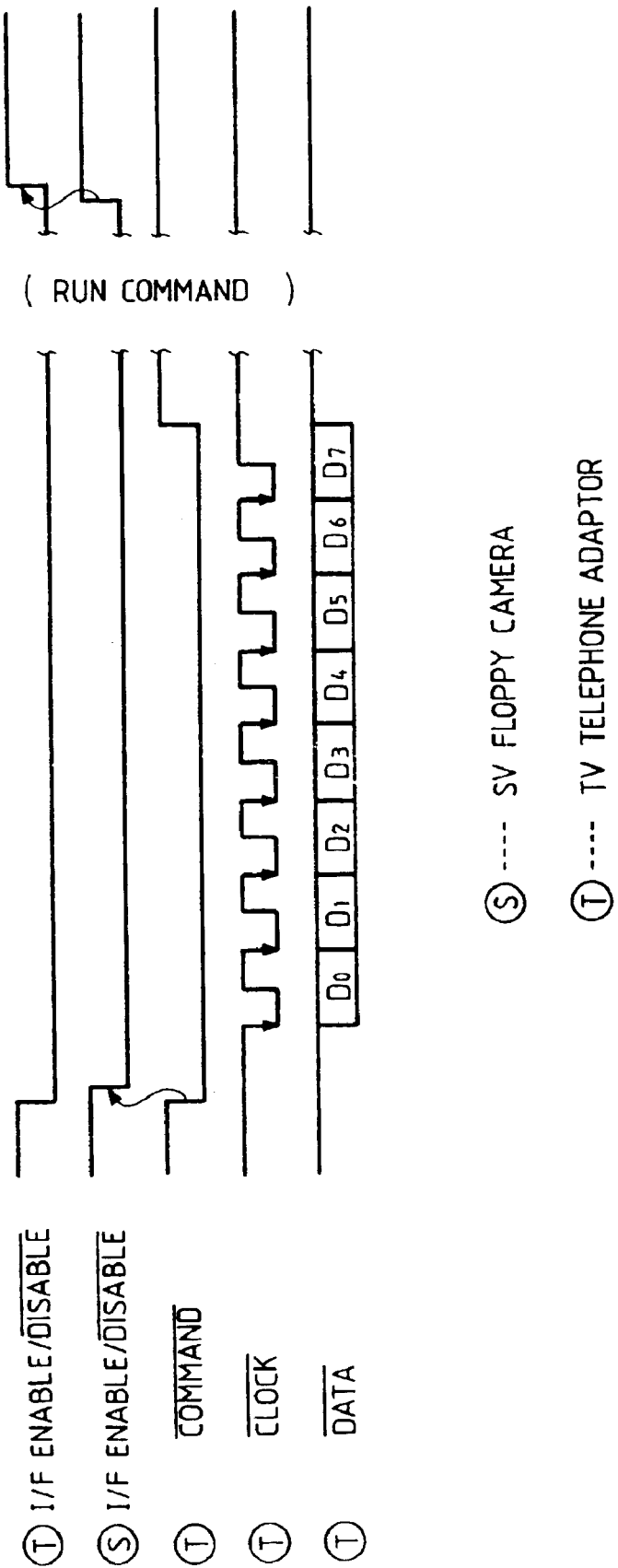
FIG. 15 illustrates a command I/O time chart (from a TV telephone adapter to an SV floppy camera) according to this embodiment of the present invention.

Also, in a case where the switch for the TV telephone adapter 33 is depressed, command data is communicated so that the adapter side CPU10 causes the camera side CPU7 to operate correspondingly. Since the difference from the above-described case lies in only a fact that the switch is set after the command has been issued from the TV telephone adapter 33 because the internal switches 27, 28 and 29 are disposed in the portion of the camera 30. All of the other operations are performed in accordance with the same protocol. FIGS. 14 and 15 respectively illustrate a flow chart and a time chart concerning the above-described operation. Since the construction is arranged in such a manner that the SV camera and the TV telephone adapter shown in FIGS. 11 and 12 are replaced with each other, their descriptions are omitted here.

The flow of an image signal and setting of the internal switches in each of the operational modes will now be described.

Figure 3:
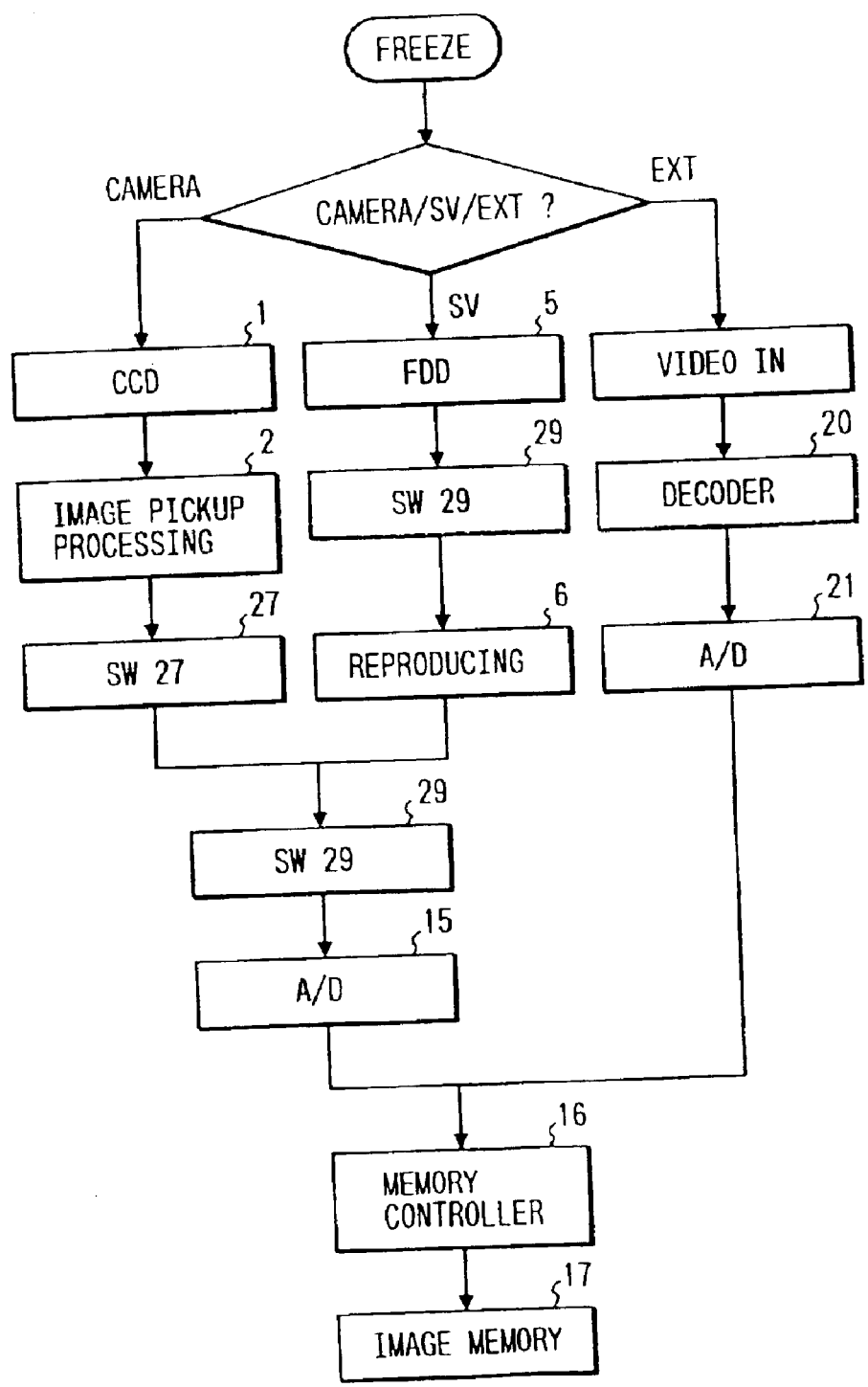
FIG. 3 is a flow chart which illustrates a freezing operation.

FIG. 3 illustrates the flow of the signal when the freeze signal is depressed. In the freeze operational mode, the CPU10 discriminates the input signal to be frozen in accordance with the input signal switch 40. In a case where the camera has been set, an image signal transmitted from the CCD1 passes through the image pickup processing circuit 2 so as to be converted into a color difference signal before it is received by the switch 29 via the switch 27. In a case where the SV is set by the input signal switch 40, a reproduction signal supplied from the floppy disk 5 is reproduced by the head 4. The reproduction signal thus-read passes through the switch 28 before it is, by the reproduction processing circuit 6, converted into a color difference signal which can be frozen in the image memory 17. The converted signal is then supplied to the switch 29. As described above, the image signal from the camera or the SV passes through the switch 29 before it is received by the A/D converter 15 so as to be converted into a digital signal. The digital signal thus-obtained is supplied to the memory controller 16. The memory controller 16 fetches the thus-supplied digital signal into the image memory 17 in accordance with the command issued from the CPU10 so that the freeze operation is completed. In a case where an external input signal is frozen, an image signal supplied through the VIDEO IN is converted into a color difference signal by the decoder 20 before it is converted into a digital signal by the A/D converter 21. The digital signal thus-obtained is then supplied to the memory controller. The memory controller fetches the above-described digital signal into the image memory 17 in accordance with a command issued from the CPU10 so that the image signal is frozen.

Figure 4:
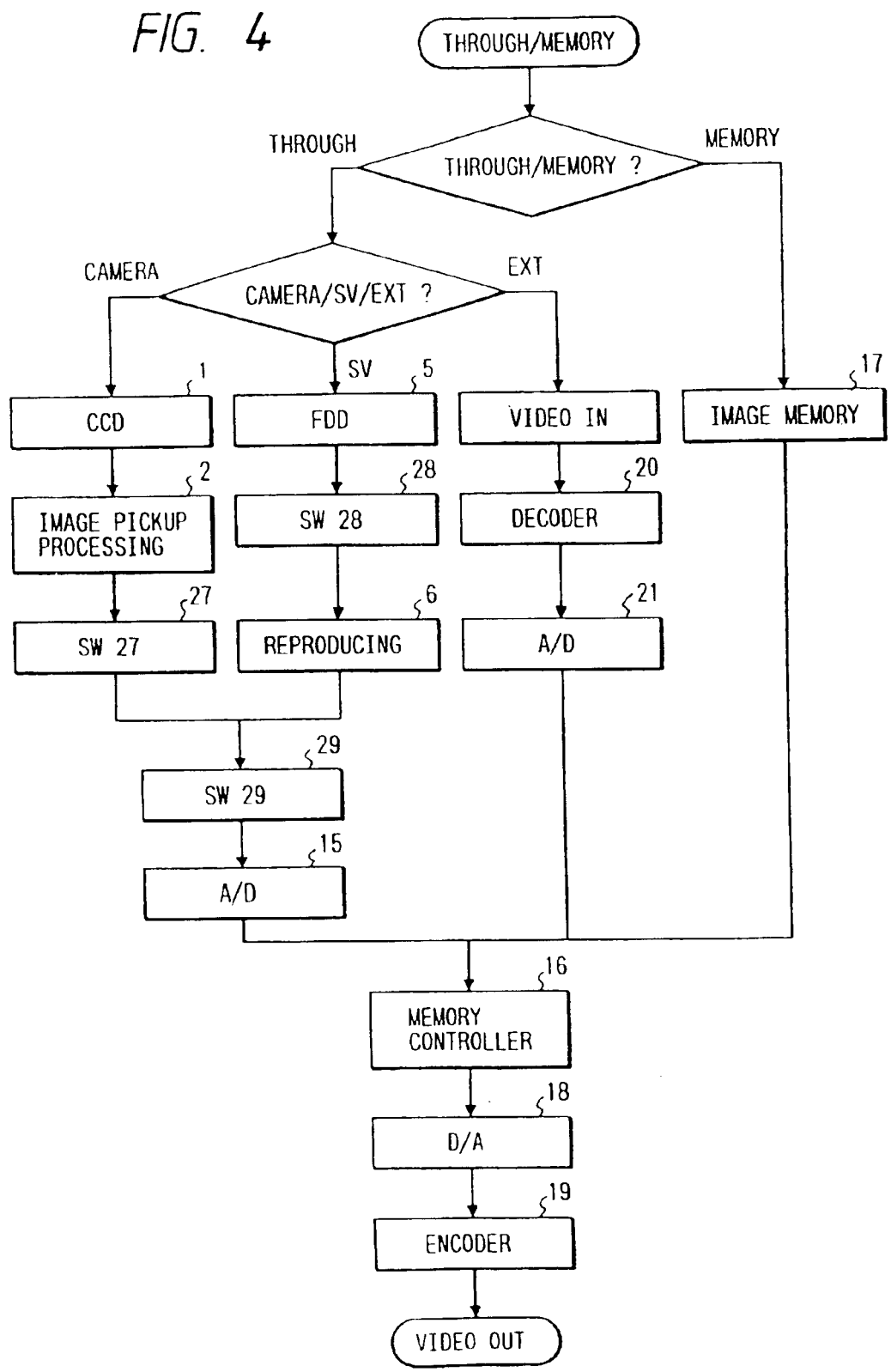
FIG. 4 is a flow chart which illustrates a through/memory displaying operation.

An operation of displaying the throughput image and that of displaying the memory image will now be described. FIG. 4 is a flow chart which illustrates the flow of the signal for use in the above-described operation. When the "through/memory" display switch is depressed, the CPU10 first discriminates that the state is the through display mode or the memory display mode. In a case of the through display mode, the input signal switch 40 is used to discriminate the input signal to be through-displayed. The result of this discrimination is any of the through display of the camera image, the through display of the SV reproduction image or the through display of the external input image. The image signal flows as follows, but the flow from each device to the memory controller 16 is omitted here because it is the same as that which takes place in the above-described freezing operation: the image signal supplied to the memory controller 16 passes through the memory controller in which it is not subjected to any operation before it is transmitted to the D/A converter 18. The image signal is again converted into the analog signal in the D/A converter 18 before it is converted into a video signal by the encoder 19. The video signal thus-obtained is transmitted through a VIDEO OUT terminal. In case of the memory display, the data in the image memory 17 is read by the memory controller 16 in synchronization with the video signal before it is converted into an analog signal by the D/A converter 18. The analog signal thus-obtained is transmitted through the VIDEO OUT terminal. Thus, the through image and the memory image are through-displayed.

Figure 5:
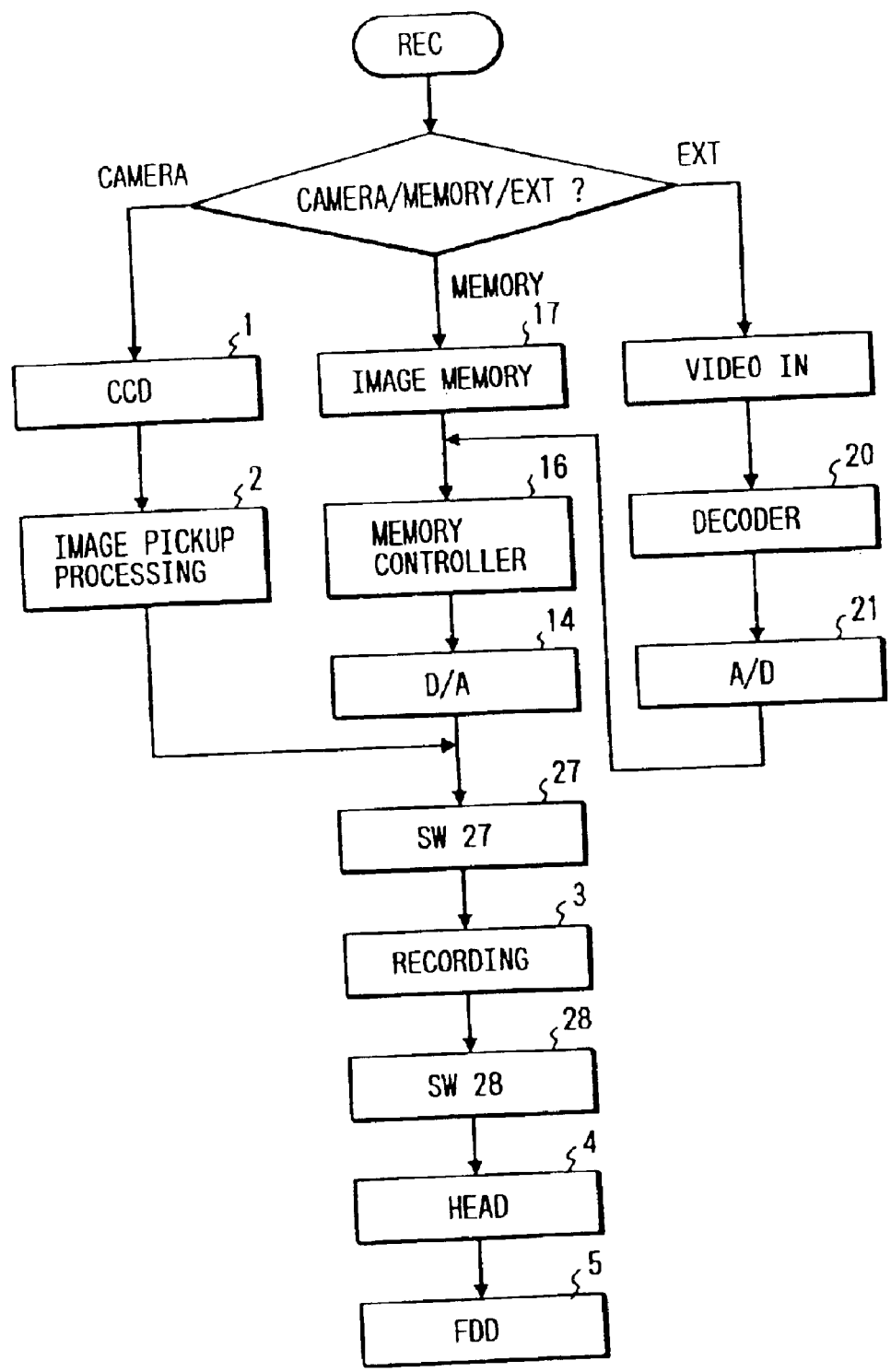
FIG. 5 is a chart which illustrates the flow of a signal at the time of a recording mode.

Then, the flow of the signal at the time of an operation of recording (Rec) data to the floppy disk 5 will now be described with reference to FIG. 5. When the Rec switch 38 is depressed, the CPU10, similar to the above-described freezing operation, discriminates the device which has transmitted the signal to be recorded, the discrimination being made in accordance with the action of the input signal switch 40. In a case where data supplied from the camera is recorded, the signal supplied from the CCD1 is converted into the color difference signal by the image pickup processing circuit 2 before it is supplied to the switch 27. In a case where data supplied from the image memory 17 is recorded, the content of the image memory 17 is read by the memory controller 16 before it is D/A-converted by the D/A converter 14 so as to transmit it to the switch 27. In a case where data of an external input signal is recorded (EXT), a signal supplied through the VIDEO IN terminal is made to be a difference signal by the decoder 20 before it is transmitted to the A/D converter 21. Then, it passes, in the form of the digital signal, through the memory controller 16 before it is again converted into the analog signal by the D/A converter 14. The analog signal is then transmitted to the switch 27. The signal thus-supplied to the switch 27 is converted into a signal to be recorded on the floppy disk 5 by the record processing circuit 3 before it passes through the switch 28. As a result, data is recorded on the floppy disk 5 by the head 4.

The flow of the data transmission will now be described with reference to FIG. 6. When the transmission switch 39 disposed in the manipulating portion 13 is depressed, the CPU10 discriminates it so that a transmission sequence is commenced. In the transmission sequence, pixel data at an arbitrary address, which corresponds to the transmission mode, is sequentially read from the image memory 17 by using the memory controller 16. Data thus-read out is transmitted to the D/A converter 22 by the CPU10 before it is converted into an analog signal. Then, it is, by the modulation circuit 23, modulated in synchronization with the carrier and in accordance with the transmission format for the TV telephone before it is transmitted to the NCU24. The NCU24 performs terminative and unbalanced/balanced conversions to transmit the above-described signal to the telephone circuit. The transmission sequence is constructed as described above.

The receiving sequence will now be described with reference to a flow chart shown in FIG. 7. The data receiving operation is completely automated while eliminating the provisions of switches. Data supplied to the NCU24 through the telephone circuit is subjected to the terminative and unbalanced/balanced conversions in the NCU24 before it is supplied to the demodulation circuit 25. The signal is then converted into the video rate signal in the demodulation circuit 25 before it is digital-converted by the A/D converter 26 so as to be read by the CPU10. The signal read by the CPU10 is transmitted to the memory controller 16 so that it is written to an address in an arbitrary image memory 17 which corresponds to the transmission mode. The data receiving sequence is constructed as described above.

The basic operation according to this embodiment is arranged as described above. However, the present invention is not limited to this. For example, a modification may be employed in which the signal supplied from the floppy disk 5 is fetched by a means which freezes it to the image memory 17 before the floppy disk 5 is interchanged so as to record it by a means capable of recording the signal in the image memory 17 to another floppy disk 5. In this case, data dubbing and editing can be performed. Another structure may be employed in which the photodetector 12 is provided for enabling all of the switches to be operated in a remote-control manner, such that data is read through the I/O11 by the CPU10 to perform the above-described operations.

Other Embodiments

Figure 9:
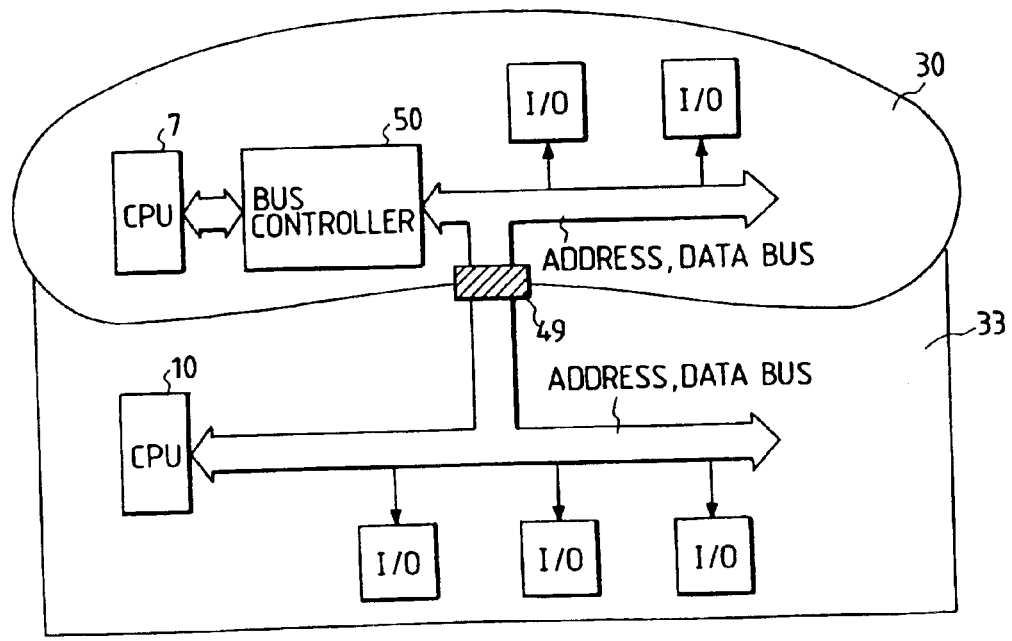
FIG. 9 illustrates an interface means according to another embodiment of the present invention.

Another method of the interface to be established between the SV camera 30 and the TV telephone adapter 33 will now be described with reference to FIG. 9, this method being able to be employed as an alternative to the method of the command interface according to the first embodiment shown in FIGS. 1 to 8. This embodiment is arranged to be different from the above-described method in which hand shaking is performed by means of the command I/O but it is arranged in such a manner that the CPU10 for the TV telephone adapter 33 controls the overall operation. When the SV camera 30 and the TV telephone adapter 33 are combined with each other, the TV camera side CPU7 is perfectly separated from the other I/O devices by a bus controller 50 so that it is brought into an independent state. However, a microcomputer bus (an address bus, a data bus and the like) for the TV telephone adapter 33 is connected by a connector 49 so that each I/O device of the camera 30 is brought into a state under control of the CPU10. As a result, the CPU10 is enabled to perform all of the controls such as scanning of the manipulation switches of the two elements, input the image, and the operation of the floppy disk. As a result, problems which can take place due to the hand shake operation, such as the time lag, can be overcome. The most significant advantage obtainable from this method lies in that no structure must be provided for software for the camera 30 to act when the TV telephone adapter 33 is connected, and thereby a load required to develop it can be reduced.

As described above, according to this embodiment, the TV telephone adapter is combined with the SV camera to constitute a still image TV telephone apparatus, and the camera is enabled to act as the image input apparatus and image recording apparatus. As a result, the subject to be photographed can be varied considerably and filing and search of the image can be completed easily. Therefore, a photograph taken at the time of a tour of the user can easily be transmitted to friends, or a photograph of a baby of the user can also easily be transmitted to the parents living far away. Furthermore, if the TV telephone adapter 33 is previously connected to a monitor TV, the necessity of connecting the SV camera 30 to the monitor TV for the purpose of reproducing the image can be eliminated. Therefore, a user who cannot easily establish the wire connection can easily produce the image. Also, charging can be performed simply by placing the SV camera 30 on the TV telephone adapter 33. Therefore, charging can be easily performed while eliminating a necessity of performing a particular charging operation.

Although the recording medium for use in the recording portion comprises the SV floppy disk according to the above-described embodiments, the present invention is not limited to this. Another recording medium, for example, an optical disk or a tape-like medium may be employed. As an alternative to this, a solid memory, for example, a semiconductor memory or a Bloch line memory may be employed.

Although the analog circuit is employed as the telephone circuit according to the above-described embodiments, it may be replaced by a digital circuit such as an ISDN. In this case, the NCU is used for the ISDN circuit.

Although the adapter for transmitting a still image is employed as the TV telephone adapter for use to serve as the public circuit adapter according to the above-described embodiments, an adapter for transmitting movable images may be used in place of the above-described adapter. The necessity lies in that it can be mounted on a detachable camera and it is able to transmit an image signal supplied from the camera or transmit the same reproduced from a record reproducing portion of the camera.

Although the attachment/detachment detection means is structured as shown in FIG. 2, the present invention is not limited to this. Another method, for example, a method for simply detecting the state of the switch, may be employed.

As described above, according to the above-described embodiments, the camera having the image pickup portion and the recording portion is made to be detachable from the image transmission adapter. Therefore, the subject can freely be photographed and the image obtained by photographing can be transmitted through a public circuit.

Although the invention has been described in its preferred form with a certain degree of particularity, it is understood that the present disclosure of the preferred form maybe changed in the details of construction and the combination and arrangement of parts may be modified without departing from the spirit and the scope of the invention as hereinafter claimed.

What is claimed is:

1. A communication apparatus which transmits digital image data to a digital line, comprising:

image pickup means for picking up an image;

digital signal generation means for generating a digital image signal to the image picked up by said image pickup means;

digital memory means for storing the digital image data; and interface means for outputting the digital image data to the digital line, wherein said image pickup means is attachable/detachable to/from said communication apparatus, and when said image pickup means is connected to said communication apparatus, a charging process by said communication apparatus of said image pickup means starts without operator input, and output of the digital image data to the digital line is performed in response to an instruction input by an operator.

2. A communication apparatus according to claim 1, wherein said image pickup means includes a CCD and signal processing means.

3. A communication apparatus according to claim 1, wherein said image pickup means includes an image pickup operation unit and, when said image pickup means is detached from said communication apparatus, said image pickup operation unit is detached from said communication apparatus.

4. A communication apparatus according to claim 1, further comprising output means for outputting a video signal corresponding to the digital image data.

5. A communication apparatus according to claim 1, further comprising semiconductor memory means for storing the image picked up by said image pickup means.

6. A communication apparatus according to claim 1, wherein in the state that said image pickup means is connected to said communication apparatus, a recording process of image data can be performed from said communication apparatus through said image pickup means.

7. A control method for a communication apparatus which includes image pickup means, digital signal generation means, digital memory means and interface means, and which transmits digital image data to a digital line, said method comprising:

an image pickup step of causing the image pickup means to pick up an image;

a digital signal generation step of causing the digital signal generation means to generate digital image data according to the image picked up in said image pickup step;

a digital memory step of causing the digital memory means to store the digital image data; and an output step of causing the interface means to output the digital image data to the digital line;

wherein the image pickup means is attachable/detachable to/from the communication apparatus, and when the image pickup means is connected to the communication apparatus, a charging process by the communication apparatus of the image pickup means starts without operator input, and output of the digital image data to the digital line is performed in response to an instruction input by an operator.

8. A control method according to claim 7, wherein in the state that the image pickup means is connected to the communication apparatus, a recording process of image data can be performed from the communication apparatus through the image pickup means.

9. A digital camera which can be connected to a communication apparatus transmitting digital image data to a digital line, said digital camera comprising:

image pickup means for picking up an image;

digital image generation means for generating digital image data according to the image picked up by said image pickup means;

storage control means for causing a memory to store the generated digital image data; and output means for outputting the digital image data to said communication apparatus, wherein, when said digital camera is connected to said communication apparatus, a charging process from said communication apparatus to said image pickup means starts without operator input, and the digital image data is output to said digital line through said communication apparatus in response to an instruction input by an operator.

10. A digital camera according to claim 9, wherein in the state that said digital camera is connected to the communication apparatus, a recording process of image data can be performed from the communication apparatus through said digital camera.

11. A communication apparatus which is connectable with a digital camera and transmits digital image data to a digital line, comprising:

charging means for charging, when said digital camera is connected to said communication apparatus, image pickup means of said digital camera without operator input;

reception means for receiving the digital image data from said digital camera in response to an instruction input by an operator, in the state that said digital camera is connected to said communication apparatus; and communication means for outputting the received digital image data to said digital line.

12. A communication apparatus according to claim 11, wherein in the state that said digital camera is connected to said communication apparatus, a recording process of image data can be performed from said communication apparatus through said digital camera.

* * * * *

UNITED STATES PATENT AND TRADEMARK OFFICE
CERTIFICATE OF CORRECTION

PATENT NO. : 6,882,362 B2
DATED : April 19, 2005
INVENTOR(S) : Eiichi Sato

It is certified that error appears in the above-identified patent and that said Letters Patent is hereby corrected as shown below:

Title page,
Item [*] Notice, insert the following:
-- This patent is subject to a Terminal Disclaimer.

This patent issued on a continued prosecution application filed under 37 CFR 1.53(d), and is subject to the twenty year patent term provisions of 35 U.S.C. 154(a)(2). --.

Column 3,
Line 23, "an D/A" should read -- an A/D --.
Line 40, "represents-an D/A" should read -- represents an A/D --.

Column 6,
Line 39, "case" should read -- a case --.

Column 8,
Line 63, "maybe" should read -- may be --.

Signed and Sealed this

Twenty-eighth Day of February, 2006

JON W. DUDAS
*Director of the United States Patent and Trademark Office*